United States Patent [19]

Valimont

[11] 4,263,350

[45] Apr. 21, 1981

[54] SILANE RELEASE SURFACES ON GLASS

[75] Inventor: James L. Valimont, Cheswick, Pa.

[73] Assignee: PPG Industries, Inc., Pittsburgh, Pa.

[21] Appl. No.: 108,929

[22] Filed: Dec. 31, 1979

[51] Int. Cl.$^3$ ............................ B05B 3/00; B32B 9/04
[52] U.S. Cl. ........................................ 427/352; 65/26; 252/12; 427/353; 428/429; 428/447; 156/99; 156/289; C03B/40/02
[58] Field of Search ............... 427/352, 353, 354, 384; 428/429, 447; 65/26; 252/12; 156/99, 289

[56] References Cited

U.S. PATENT DOCUMENTS

| 3,451,886 | 6/1969 | Eakins | 428/429 X |
| 3,706,592 | 12/1972 | Thomson | 428/429 X |
| 3,808,077 | 4/1974 | Rieser | 156/102 |
| 4,073,967 | 2/1978 | Sanduig | 428/429 X |

Primary Examiner—Michael R. Lusignan
Attorney, Agent, or Firm—Donna L. Seidel

[57] ABSTRACT

A release surface prepared by treating a glass substrate with dimethyldichlorosilane and trimethylchlorosilane is disclosed, wherein the proportion of trimethylchlorosilane is sufficient to facilitate cleaning or residue from the release surface but insufficient to substantially diminish the release efficiency of the treated surface.

7 Claims, No Drawings

4,263,350

SILANE RELEASE SURFACES ON GLASS

BACKGROUND OF THE INVENTION

The present invention relates generally to the art of release surfaces on glass and more particularly to silane treatment of glass surfaces to promote release of acrylics, polycarbonates, polyurethanes and other plastics.

THE PRIOR ART

In U.S. Pat. No. 3,808,077 Rieser et al disclose fabricating a transparent laminated window by assembling a preformed plastic sheet between a glass sheet to be laminated thereto and a glass mold with a suitable parting material between the mold and the plastic to facilitate release. Suggested parting materials include polyvinyl fluoride, polyethylene glycol terephthalate and organopolysiloxanes.

Methylchlorosilanes and methylsilazanes are employed as hydrophobic, electrically insulating, permanent surface treatments on cellulosic or siliceous substrates. For example, such treatments are known to render glass container surfaces less readily wettable by organic contents.

In U.S. application Ser. No. 108,931 filed on even date herewith, Frey et al disclose a method for treating glass with dimethyldichlorosilane to form a release surface. An oily residue, presumably dimethylsiloxane polymer, is formed on the release surface and must be removed prior to use by washing with polar solvents to prevent transfer of the residue to the released plastic surface resulting in commercially unacceptable haze.

SUMMARY OF THE INVENTION

The present invention involves the treatment of a glass mold with a methylchlorosilane release agent which comprises a mixture of dimethyldichlorosilane and trimethylchlorosilane. The use of a small portion of trimethylchlorosilane in the dimethyldichlorosilane release agent provides a release surface which is as effective as that obtained using dimethyldichlorosilane alone, while substantially facilitating the removal of oily residue from the release surface by washing with a polar solvent.

DESCRIPTION OF THE PREFERRED EMBODIMENTS

A glass substrate is preferably used as a mold in the fabrication of a glass/plastic laminate because of its optically smooth surface and its similarity in physical properties, such as coefficient of thermal expansion, to the glass lamina. However, the glass mold will adhere to the plastic lamina unless an efficient release surface is developed. According to U.S. application Ser. No. 108,931 filed on even date herewith and incorporated herein by reference, a superior release surface is prepared by treating the glass surface with dimethyldichlorosilane. However, an oily residue, presumably dimethylsiloxane polymer, is formed on the release surface. This residue will transfer to the released plastic and impart haze, and must therefore be removed before the release surface is used. Repeated washings with alcohol and hand buffing are disclosed to be effective.

According to the present invention, equivalent release efficiency is obtained by treating the glass surface with a mixture of dimethyldichlorosilane and trimethylchlorosilane. The use of a small proportion of trimethylchlorosilane is believed to reduce the molecular weight of the dimethylsiloxane polymer residue making it easier to wash the residue from the release surface to prevent transfer of the residue to the released plastic surface which would otherwise result in unacceptable haze in the laminated product.

Glass molds large enough for use in fabricating windshields are thoroughly cleaned with an equal volume solution of demineralized water and isopropanol, preferably avoiding the use of detergents. The glass molds are mounted on a wooden rack and placed in a galvanized steel spray chamber equipped with access ports.

A mixture of dimethyldichlorosilane and trimethylchlorosilane is sprayed into the chamber through the access ports. At a relative humidity of water of at least about 55 percent, a heavy fog is formed inside the chamber and an oily film develops on the glass. After about 15 minutes, the chamber is exhausted and the glass molds are removed.

The excess material on the release surface is removed, preferably by a first wash with a detergent solution, a second with isopropanol and a final with an equal volume mixture of isopropanol and water. Fewer washes and less hand buffing are required to remove the residue than are needed to clean the release surface when dimethyl dichlorosilane alone is used as the release agent.

At concentrations of less than 0.1 percent trimethylchlorosilane, there is little improvement in the cleaning process. Above 0.1 percent trimethylchlorosilane, there is increasing improvement in the ease of removing the residue from the release surface. Up to about 2.5 percent trimethylchlorosilane, the release properties of the treated glass surface are equivalent to the release properties of a surface treated with dimethyldichlorosilane alone. At concentrations greater than 2.5 percent trimethylchlorosilane, the release efficiency of the treated surface diminishes. Experiments using 100 percent trimethylchlorosilane resulted in treated glass surfaces which would not release. Therefore, a methylchlorosilane release agent comprising from about 90.0 to 99.9 percent dimethyldichlorosilane and from about 0.1 to 10 percent trimethylchlorosilane is preferred, with a concentration of 0.5 to 2.5 percent trimethylchlorosilane especially preferred. Although heating is not required to facilitate removal of residue with trimethylchlorosilane concentrations of 0.5 percent or more, if the glass mold is to be used for multiple release operations, its useful life may be extended by heating the mold in an oven prior to cleaning the release surface. An hour heat treatment at about 400° F. to 425° F. (about 204° to 218° C.) is preferred.

The present invention will be further understood from the description of specific examples which follow.

EXAMPLE I

An equal volume solution of isopropanol and demineralized water is used to clean 12 inch (30.5 cm) square glass substrates. The samples are then placed in a chamber at ambient temperature and about 55 percent relative humidity. A mixture of 99.99 percent dimethyldichlorosilane and 0.01 percent by weight trimethylchlorosilane is sprayed into the chamber forming a heavy fog. After 2 to 3 minutes, the fog is exhausted from the chamber and the samples are removed. Half of the treated substrates are heated in an oven to 400° F. (204° C.) for one hour. All of the samples are then cleaned by hand buffing, first with a detergent solution, then with isopropanol and finally with an equal volume solution of isopropanol and demineralized water. The unheated samples are rated hard to clean while the heated samples are rated fair. (For comparison samples treated with 100 percent dimethyldichlorosilane are rated hard to clean and fair for unheated and heated samples respectively). After cleaning, the treated substrates are used as pressing plates to laminate polyurethane to glass. Upon release, the optical quality of the laminates range from fair with the heated samples to poor with the unheated samples. (For comparison, the optical quality of laminates released from dimethylchlorosilane treated surfaces range from fair with heated samples to poor with unheated samples, although the release properties are rated very good to excellent.)

EXAMPLE II

Release surfaces are prepared as in Example I except that a mixture containing 0.1 percent trimethylchlorosilane is used. Heated samples are easy to clean and produce fair optical quality laminates. Unheated samples are still rated hard to clean and result in poor optics, but the release properties are rated as excellent.

EXAMPLE III

Release surfaces are prepared as in the previous examples, except that a mixture containing 0.5 percent trimethylchlorosilane is used. Unheated samples are easy to clean, give very good release and produce excellent optical quality laminates.

EXAMPLE IV

Release surfaces are prepared as in the previous examples except that a mixture containing 1.0 percent trimethylchlorosilane is used. Although only the unheated samples are rated excellent in release properties, both heated and unheated samples are easy to clean and produce excellent optical quality laminates.

EXAMPLE V

Release surfaces were prepared as in the previous examples, except that a mixture containing 2.5 percent trimethylchlorosilane is used. Unheated samples are easy to clean, give excellent release and produce excellent optical quality laminate.

EXAMPLE VI

Release surfaces are prepared as in the previous examples, except that a mixture containing 10 percent trimethylchlorosilane is used. While both heated and unheated samples are easy to clean and produce excellent optical quality laminates, the release efficiency is rated at only fair for the heated samples although still very good for the unheated samples.

In the above examples, ease of cleaning and release of the treated surface and optical quality of the released surface are rated qualitatively. While ratings for individual samples may be highly variable, the ratings reported in the examples are average ratings of multiple samples. These examples are offered to illustrate the present invention, the scope of which is defined by the following claims.

I claim:
1. In a method for treating a glass substrate with dimethyldichlorosilane to develop a release surface, the improvement which comprises adding a small effective amount of trimethylchlorosilane to the dimethyldichlorosilane to provide for an easily cleanable treated release surface.
2. The method according to claim 1 wherein the amount of trimethylchlorosilane is from about 0.1 to about 10 percent.
3. The method according to claim 2 wherein the amount of trimethylchlorosilane is from about 0.5 to 2.5 percent.
4. The method according to claim 1 which further comprises the step of cleaning the treated release surface, whereby a residue produced on the release surface by the silane treatment is removed by contact with a polar solvent.
5. The method according to claim 4 wherein the solvent comprises an alcohol.
6. The method according to claim 4 wherein the solvent comprises isopropanol.
7. The method according to claim 6 wherein the solvent further comprises water.

* * * * *

UNITED STATES PATENT AND TRADEMARK OFFICE
CERTIFICATE OF CORRECTION

PATENT NO. : 4,263,350
DATED : April 21, 1981
INVENTOR(S) : James L. Valimont

It is certified that error appears in the above-identified patent and that said Letters Patent are hereby corrected as shown below:

In the Abstract, line 4, "or" should be --of--.

Signed and Sealed this

Eighteenth Day of August 1981

[SEAL]

*Attest:*

*Attesting Officer*

GERALD J. MOSSINGHOFF

*Commissioner of Patents and Trademarks*